US007115542B2

(12) United States Patent
Tranter et al.

(10) Patent No.: US 7,115,542 B2
(45) Date of Patent: Oct. 3, 2006

(54) REMOVAL OF RADIOACTIVE AND OTHER HAZARDOUS MATERIAL FROM FLUID WASTE

(75) Inventors: Troy J. Tranter, Idaho Falls, ID (US); Dieter A. Knecht, Idaho Falls, ID (US); Terry A. Todd, Aberdeen, ID (US); Larry A. Burchfield, W. Richland, WA (US); Alexander G. Anshits, Krasnoyarsk (RU); Tatiana Vereshchagina, Krasnoyarsk (RU); Alexander A. Tretyakov, Zheleznogorsk (RU); Albert S. Aloy, St. Petersburg (RU); Natalia V. Sapozhnikova, St. Petersburg (RU)

(73) Assignee: The United States of America as represented by the United States Department of Energy, Washington, DC (US)

( * ) Notice: Subject to any disclaimer, the term of this patent is extended or adjusted under 35 U.S.C. 154(b) by 93 days.

(21) Appl. No.: 10/748,913

(22) Filed: Dec. 11, 2003

(65) Prior Publication Data

US 2004/0138514 A1   Jul. 15, 2004

(51) Int. Cl.
*B01J 20/22* (2006.01)
(52) U.S. Cl. .................. 502/401; 502/407; 502/439
(58) Field of Classification Search .............. 502/401, 502/407, 439
See application file for complete search history.

(56) References Cited

U.S. PATENT DOCUMENTS 4,788,164 A * 11/1988 Che et al. .................. 501/39
6,710,013 B1 * 3/2004 Kato et al. ................. 502/439

OTHER PUBLICATIONS

Suss. M. et al., "Investigation of the Sorption of Cesium from Acid Solutions by Various Sorbents", Radiochimica Acta. 29, pp. 33-40 (1981).
Smit. J. Van R., "Insoluble Heteropolyacid Salts", Inorganic Ion Exchangers in Chemical Analysis, pp. 68-69, CRC Press. Boston. 1991.
Aloy, A. S. et al., "Development and Testing of a New Porous Crystalline Matrix (Gubka) for Stabilizing Actinide Solutions", Scientific Basis for Nuclear Waste Management XXIII, Mat. Res. Soc. Symp. Proc., vol. 608. pp. 637-642. Oct. 9 (2000).
Knecht, D. A. et al., "Progress in Development of Porous Crystalline Matrix (Gubka) for Stabilizing Liquid Waste Solutions", Proceedings of Waste Management 2001. , Tuscon, AZ. Mar. (2001).
Anshits, A.G. et al., "Development and Characteristics of a New Porous Glass Crystalline Matrix (Gubka) for Stabilizing Radioactive and Hazardous Solutions", Scientific Basis for Nuclear Waste Management XXIV, Mat. Res. Soc. Symp. Proc. , vol. 663, Dec. 21 (2001).
Tranter, T. J. et al., "Evaluation of Ammonium Molybdophosphate-Polyacrylonitrile (AMP-PAN) as a Cesium Selective Sorbent for the Removal of Cs-137 from Acidic Nuclear Waste Solutions", Advances in Environmental Research, vol. 6, Issue 2, pp. 107-121, Mar. (2002).

* cited by examiner

Primary Examiner—Edward M. Johnson
(74) Attorney, Agent, or Firm—Julia Cook Moody; Paul A. Gottlieb (57) ABSTRACT

Hollow glass microspheres obtained from fly ash (cenospheres) are impregnated with extractants/ion-exchangers and used to remove hazardous material from fluid waste. In a preferred embodiment the microsphere material is loaded with ammonium molybdophosphonate (AMP) and used to remove radioactive ions, such as cesium-137, from acidic liquid wastes. In another preferred embodiment, the microsphere material is loaded with octyl(phenyl)-N-N-diisobutyl-carbamoylmethylphosphine oxide (CMPO) and used to remove americium and plutonium from acidic liquid wastes.

11 Claims, 8 Drawing Sheets

Block loaded with AMP, in a 0.2 M $HNO_3$ and 2 mg/L cesium

Figure 1

Block loaded with AMP, in a 2 $\underline{M}$ HNO$_3$ and 1000 mg/L cesium

Figure 2

Block loaded with AMP, in a 1.5 $\underline{M}$ HNO$_3$ and 500 mg/L cesium

Figure 3

Cs-137 Breakthrough vs. Time
Block Loaded with AMP, Feed at 4 BV/hr, 1.5 $\underline{M}$ HNO$_3$ and 1 mg/L Cs.

Figure 4

Cs-137 Breakthrough vs. Time
Blocks loaded with AMP, Feed at 2 BV/hr, 1.5 $\underline{M}$ HNO$_3$ and 1mg/L Cs.

Figure 5

Cs-137 Fractional Breakthrough
Blocks loaded with AMP, Feed at 2 BV/hr., 1.5 $\underline{M}$ $HNO_3$ and 1 mg/L Cs.

Figure 6

Block Loaded with CMPO, in 2.5 M $HNO_3$ and 74 Bq/mL Am-241

Figure 7

Block Loaded with CMPO, in 2.5 M $HNO_3$ and 70 Bq/mL Am-241

Figure 8

Acidic tank waste spiked with $^{137}$Cs.
Blocks loaded with AMP.

Figure 9

Volume of tank waste treated (A)
Bed Material Blocks loaded with AMP (B)
HUPed bed material (C)

REMOVAL OF RADIOACTIVE AND OTHER HAZARDOUS MATERIAL FROM FLUID WASTE

CONTRACTUAL ORIGIN

This invention was made with government support under a contract awarded by the U.S. Department of Energy. The U.S. Government has certain rights in the invention.

PRIORITY CLAIM

Priority in this invention is claimed from Russian patent application 2002134781/20 (036921) filed Dec. 18, 2002.

BACKGROUND OF THE INVENTION

1. Field of the Invention

The present invention relates generally to a method of making hollow glass crystalline microspheres (also known as cenospheres), which have selective extractive or ion exchange capability, by impregnation of the microspheres with selective extractants or ion exchangers. The invention also relates to the method of using the prepared microsphere material to remove radioactive nuclides and/or other hazardous materials from fluids (liquid or gas). In particular the microspheres can be impregnated with certain selective ion exchangers that will remove cesium, lanthanides and actinides.

2. Related Art

U.S. patent application Ser. No. 09/721,962, filed Nov. 27, 2000, discloses the method of making an open-cell glass crystalline porous matrix material comprising microspheres from fly-ash.

U.S. patent application Ser. No. 09/721,963, filed Nov. 27, 2000, discloses a method of solidifying liquid radioactive waste and other hazardous waste using the open-cell glass crystalline porous matrix material as a substrate for evaporation. In that method, selected microspheres are molded into porous glass crystalline blocks, and liquid waste is incorporated into the blocks by multiple cycles of saturating the blocks with liquid, and then drying. After multiple loading/drying cycles, a final calcining step completes the process. Metal oxides with a high specific surface area may be added to the blocks prior to the loading step. The metal oxides are used to increase the surface area and are not ion exchangers or extractants.

The use of pumice as a support for ion exchange material is disclosed in a 1939 British patent 506,291. That patent discloses using pumice stone, ground to a fine mesh size, used as a carrier for thin layers of resin ion exchangers.

SUMMARY OF THE INVENTION

Ion exchange is a widely recognized technology for removing target ions from aqueous solutions. It is a relatively mature science that is utilized in a variety of industries, ranging from pharmaceuticals to water purification. It is often a preferred technology from a process engineering perspective because of its simplicity, relatively small footprint and lower capital investment compared to other separation processes. Specifically, this technology has been utilized in the nuclear industry for removing radionuclide metals from reactor coolant and waste streams in nuclear power generating stations. However, there is a current pressing need to customize this technology in such a manner so that it can be applied to separating or partitioning radionuclides from aqueous "legacy" wastes, i.e. wastes associated with Cold War era activities. For example, there is an urgent need to separate the high activity fission products such as $^{137}$Cs and $^{90}$Sr from the longer-lived transuranic isotopes so that each can be disposed in an appropriate repository. However, unlike the waste streams associated with nuclear power plants, legacy waste streams are usually the result of some dissolution process in the Highly Enriched Uranium (HEU) fuel cycle or weapons production, or from the off-gas scrub streams associated with vitrification processes used to solidify these liquid wastes. These streams are typically very acidic or very alkaline and potentially of very high ionic strength. These characteristics make this waste very problematic for any type of separation process. Consequently, an extractant or ion exchange material designed for use with these waste streams must be quite unique in that it must have a very high selectivity and stability in high radiation, high temperature, and acid or alkaline environments.

The current state of the art for ion exchange or fixed bed extractant technology typically utilizes some type of organic polymer such as polystyrene or polyacrylonitrile as a support or substrate for the extractant material. Although these are usually more porous than inorganic supports, and provide good diffusion and hydrodynamic properties, they are not stable in radiation environments. This makes them undesirable for treating radioactive waste streams due to the potential of hydrogen gas generation. If they are used in this capacity, it becomes necessary to "regenerate" the resin, or remove the radioactive target contaminants on a routine basis to keep the absorbed dose low. These organic resins cannot be used as a storage medium due to leachability and the potential for hydrogen gas generation resulting from radiolytic degradation of the organic matrix. Inorganic ion exchange materials are usually superior in their ability to satisfy the criteria of low leachability and stability as a storage medium. However, inorganic ion exchange media typically exist as fine powders, making large-scale use impractical, unless the media can be affixed to an appropriate matrix.

Accordingly it is an object of the invention to provide a totally inorganic composite ion exchange material or fixed bed extractant that can be used in the treatment of hazardous waste, especially fluid legacy radioactive waste.

It is another object of the invention to provide an ion exchange material or fixed bed extractant material that can withstand high radiation, high temperatures, and highly acidic or alkaline environments.

It is a further object of the invention to provide a method of removal of hazardous contaminants from fluid waste.

It is a further object of the invention to provide a method of removal of lanthanides and actinides from fluid waste.

It is yet a further object of the invention to provide a method of removal of radioactive cesium from fluid waste.

DETAILED DESCRIPTION OF THE INVENTION

As described in U.S. patent application Ser. No. 09/721,962, filed Nov. 27, 2000, incorporated herein by reference, an open-cell glass crystalline porous material is produced from hollow glass crystalline microspheres (cenospheres) formed as small mineral slag particles in fly ash from coal combustion. The microsphere sizes typically range from 0.1 to 0.5 mm in diameter. The average compositions of the microspheres used to prepare the porous matrix-material include primarily the minerals common in glass, including up to 65 wt. % silicon dioxide, 25 wt. % aluminum oxide, and lower amounts of iron, calcium, magnesium, potassium and titanium oxides ranging from less than one to five percent.

The method of preparation of the porous material, as detailed in U.S. patent application Ser. No. 09/721,962, includes separating the microspheres into fractions based on size, density, magnetic or non-magnetic, and perforated or non-perforated characteristics. The microsphere walls can be further treated with acids to form perforations, allowing the interior volume of individual microspheres to be accessible to fluids. Selected microsphere portions are molded and agglomerated by sintering with or without a binder at high temperatures to produce a porous glass matrix material, which may be molded in the form of blocks, but is not limited to that shape. The porous matrix material consists of two types of porous openings: intraglobular pores in the microsphere walls of 0.1–30 micrometers, and interglobular pores between the microspheres of 20–100 micrometers. Depending on the microsphere fractions selected, sintering conditions and additional treatments, the material is formed with a total open-cell porosity ranging from about 40–90 vol %, an apparent density of 0.3–0.6 g/cm$^3$ and a compressive strength in the range of 1.2–3.5 Mpa. The porous material is chemically stable in concentrated nitric, hydrochloric, sulfuric, and phosphoric acids at boiling temperatures. For these reasons this porous material was selected as a particularly attractive candidate for a substrate for selective extractants and ion exchangers, to remove radioactive nuclides from fluid waste, especially very acidic liquid waste.

As used hereinafter, the term "extractant(s)" is intended to encompass compounds that function as an ion exchanger, or as an extractant. "Extractant material" as used herein is intended to encompass the porous glass crystalline microsphere matrix with the extractant or ion-exchanger impregnated thereon.

The extractant material of the invention is prepared as follows: The porous glass microsphere material is weighed. The glass microsphere material may be in the form of loose microspheres as well as in the form of a block or blocks, and the use of "blocks" herein is not intended to limit the material to any particular shape, but is for purposes of example only. The desired selective extractant compound is dissolved in a suitable solvent and loaded under vacuum into the inside of the porous glass microspheres in the block. A suitable solvent is one in which the extractant has a high solubility and one that has a boiling temperature below the degradation temperature of the desired extractant compound. In most cases this is water, acids, bases, or an organic liquid with high vapor pressure such as acetone or hexane. After the selective extractant has been loaded into the glass block, the block is dried and weighed again to determine the amount of extractant added. This method is preferred when the extractant compound is soluble in a solvent other than that associated with the waste to be treated. For example, an organic extractant is soluble in hexane but insoluble in a waste stream of nitric acid.

Another method of preparation that is used to make the selective extractant compound material is to dissolve one of the reactants used to make the extractant compound in a suitable solvent. The porous glass block is weighed, then placed in a vacuum chamber and negative pressure is established to remove the air from the inside of the microspheres. The solvent containing the dissolved reactant is then allowed to enter the chamber and fill the inside of the hollow microspheres in the glass block. The block is then dried to evaporate the solvent. The same procedure is repeated with the other reactant(s) and the desired compound is synthesized in situ. This can also be accomplished by leaving the first reactant in the microspheres in the solvent phase and allowing the other reactant(s) and solvent to flow around the perforated microspheres in the interstitial voids between the microspheres in the block. The other reactant(s) then diffuses into the microspheres to complete the reaction in situ. One more method to make the selective extractant compound material is based on the precipitation of insoluble compound inside of the microspheres under an action of a gaseous reactant. The solid reactants used to make the extractant compound are dissolved in a suitable solvent. The loose microspheres are weighed, then placed in a vacuum chamber and negative pressure is established to remove the air from the inside of the microspheres. The solvent containing the dissolved reactants is then allowed to enter the chamber and fill the inside of the hollow microspheres. The filled microspheres are put in another chamber and third gaseous reactant is allowed to flow through the microsphere bed diffusing into the microspheres to complete the reaction in situ. This technique is primarily applicable when the desired compound is an insoluble salt, i.e. the reaction to form the insoluble precipitate must take place inside the microspheres.

Once the block of microspheres or loose microspheres are loaded with the desired compound, the glass block or loose microspheres are dried to evaporate the solvent. The interstitial voids between the microspheres are rinsed to remove any loose particles of extractant compound left outside the microspheres. The rinse agent can be any suitable fluid which will physically remove the loose particles of extractant without dissolving the extractant. The loaded glass block or loose microspheres are then dried and weighed and the mass fraction of extractant is calculated by weight difference between the initial and final weight. At this point the loaded block may be stored for future use.

Prior to using the prepared loaded block, the blocks or the loose microspheres are placed in a vacuum chamber, or in a column and air is evacuated. Next the blocks are wetted with a suitable fluid in order to fill the microspheres so that a medium for mass transport exists. Suitable fluids include the same fluids in which the contaminants are contained, for example $HNO_3$ and water. This pre-wetting step is not necessary if the first step in the process is to fill the microspheres with the contaminant-containing feed material itself, as described below. The chamber, or column, is filled with a portion of the radioactive or hazardous fluid to be treated which fills the voids between the microspheres as well as the inside of the spheres themselves. The fluid waste can be treated in a batch mode by immersing the prepared block(s) in a volume of the waste and mixing, or in a continuous flow process such as with an ion exchange column. The desired contaminants diffuse into the microspheres and are trapped by the selective extractant. When the capacity of the extractant material is exhausted the glass support block can be further consolidated by hot uniaxial pressing (HUPing) or hot isostatic pressing. The compressed block can then be high-fired to give a refractory and stable waste form.

Any suitable extractant may be used in the invention, depending on the contaminants that are to be removed. A nonlimiting example of some of the selective extractants that can been used in the present invention are ammonium molybdophosphate $(NH_4)_3P(Mo_3O_{10})_4 3H_2O$ (AMP), octyl (phenyl)-N—N-diisobutyl-carbamoylmethylphosphine oxide (CMPO), resorcin formaldehyde resin (RFR), and tertiary phosphine oxides with various alkyl radicals (POR, where R=alkyl groups having 5–9 carbon atoms) especially isoamyl-heptyl-nonyl-phosphine oxide. Ammonium molybdophosphate, $(NH_4)_3P(Mo_3O_{10})_4 3H_2O$ (AMP), is a yellow crystalline inorganic compound. AMP has been demonstrated by Smit and Van in "Insoluble Heteropolyacid Salts", *Inorganic Ion Exchangers in Chemical Analysis*, M. Qureshi and K. G. Varshney (Eds.), pp. 68–69, CRC Press, Boston, 1991, to be highly selective for Cs and exhibits a selectivity sequence for the alkali metals similar to other heteropolyacids of the Keggin structure; $Cs^+>Rb^+>K^+>Na^+>Li$. This selectivity for Cs over other cations and excellent distribution coefficient in $HNO_3$ systems, up to 10 N, has been demonstrated by Suss and Pfrepper, "Investigation of the Sorption of Cesium from Acidic Solutions by Various Inorganic Sorbents, *Radiochimica Acta*, 29, pp. 33–40, (1981).

EXAMPLES

The following examples are put forth so as to provide those of ordinary skill in the art with a complete disclosure and description of the methods and products claimed herein, and are intended to be purely exemplary of the invention and are not intended to limit the scope of what the inventors regard as their invention.

Example 1

Batch Test

Figure 1:
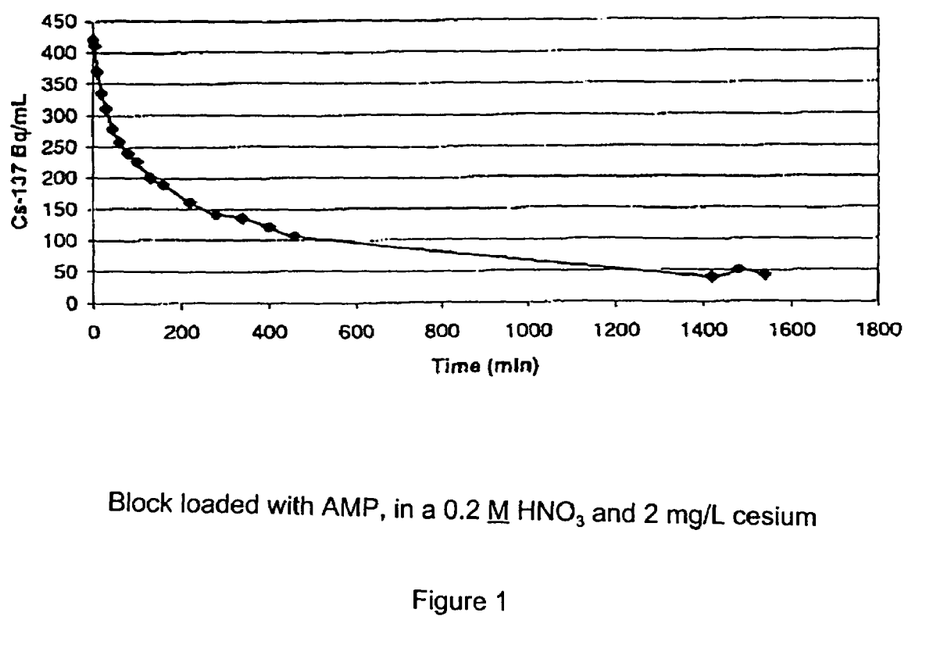
FIG. 1 Amount of $^{137}$Cs removed vs. time from a 2 mg/L cesium feed solution in 0.2 M $HNO_3$ using the microsphere material of the invention loaded with AMP.
Figure 2:
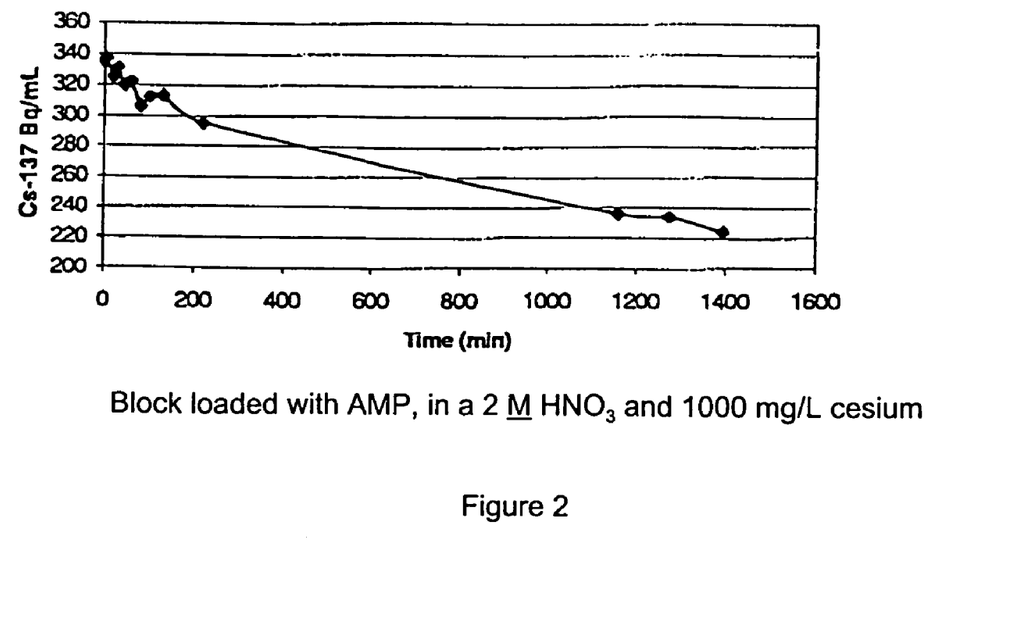
FIG. 2 Amount of $^{137}$Cs removed vs. time from a 1000 mg/L cesium feed solution in 2 M $HNO_3$ using the microsphere material of the invention loaded with AMP.
Figure 3:
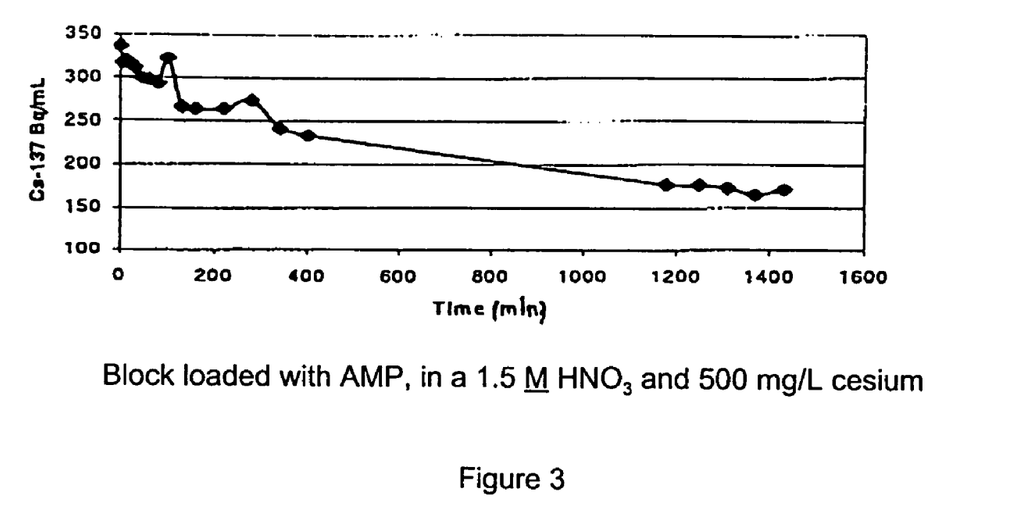
FIG. 3 Amount of $^{137}$Cs removed vs. time from a 500 mg/L cesium feed solution in 1.5 M $HNO_3$ using the microsphere material of the invention loaded with AMP.

Blocks of perforated microspheres were impregnated with ammonium molybdophosphonate (AMP). The total volume of the blocks used ranged from approximately 3 $cm^3$ to 4.5 $cm^3$ with an internal void volume between microspheres of approximately 40% and a total void volume (including hollow microsphere volume) of approximately 60%. The AMP was dissolved in 5.8 M $NH_4OH$ at a ratio of 1 gram AMP to 5 mL of $NH_4OH$ solution. The AMP was loaded into the microspheres under vacuum. (This step may be repeated to increase the mass loading of the AMP. In a preferred method, three loadings were used). The loaded blocks were then heated at about 105° C. for 2.5 hours. After the drying, 4 M $HNO_3$ was added to the blocks under vacuum. This was done to ensure that the AMP, which is insoluble in $HNO_3$ was completely precipitated inside the microspheres. Excess AMP was washed from the interstitial spaces between the microspheres by passing approximately 10 mL of 2 M $HNO_3$ through the block. Loading of AMP averaged 30% by mass. The blocks were suspended with stainless steel wire into 120 mLs of $HNO_3$ containing stable $^{133}Cs$ and radioactive $^{137}Cs$ (obtained from Isotope Products Inc., Burbank Ca.). The feed was stirred constantly and small aliquots of approximately 0.10 mL were removed over time and analyzed by gamma-ray spectroscopy to determine the total cesium uptake. Gamma analyses for these and all other $^{137}Cs$ values were done with a high purity germanium detector (Oxford Instruments Inc., 80% Coaxial) and associated electronics (Canberra 8701Amp., Ortec 572 ADC) coupled to a Sun computer workstation (SUN Microsystems, Sparc 10). The results and parameters are shown in FIGS. 1–3. These data indicate substantial cesium removal with loadings ranging from 20 to 60 mg Cs/g AMP.

Instead of dissolving the AMP in $NH_4OH$ solution, two alternate methods of loading the AMP into the microsphere matrix material can be used. The first one is to combine the reactants $NH_4NO_3$ and $(NH_4)_6Mo_7O_{24}$ in a citric acid and water solution, add nitric acid and load the solution into the microspheres as above. Dissolve $(NH_4)_2HPO_4$ in water and flow this solution over the loaded microspheres to cause the reactants to combine and to precipitate the AMP inside the microspheres. The second method is to dissolve the reactants $(NH_4)_6Mo_7O_{24}$ and $(NH_4)_2HPO_4$ in water and load the solution into the microspheres as above. Flow gaseous hydrogen chloride through the loaded microsphere bed to precipitate the AMP inside the microspheres.

Example 2

Dynamic Column Test

Figure 4:
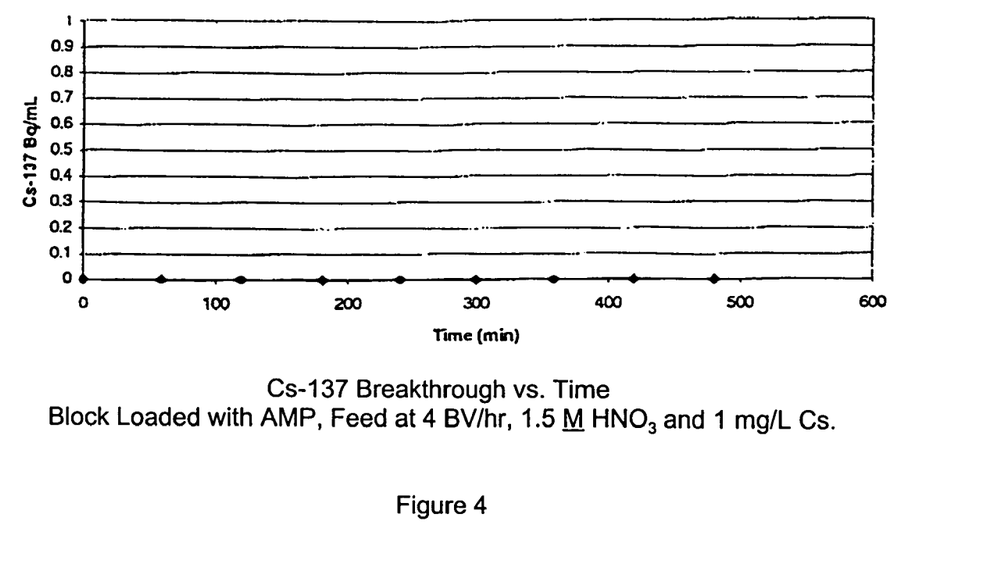
FIG. 4 Amount of $^{137}$Cs in column effluent (breakthrough) vs. time. Blocks loaded with AMP. Feed rate 4 BV/hr, 1.5 M HNO$_3$ and 1 mg/L Cs.
Figure 5:
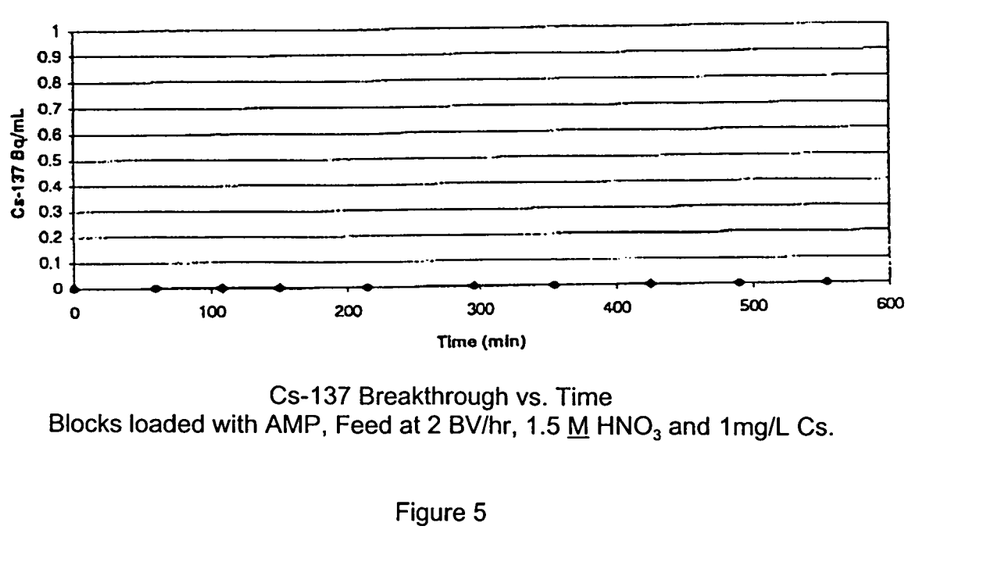
FIG. 5 Amount of $^{137}$Cs in column effluent vs. time. Blocks loaded with AMP. Feed rate 2 BV/hr, 1.5 M HNO$_3$ and 1 mg/L Cs.
Figure 6:
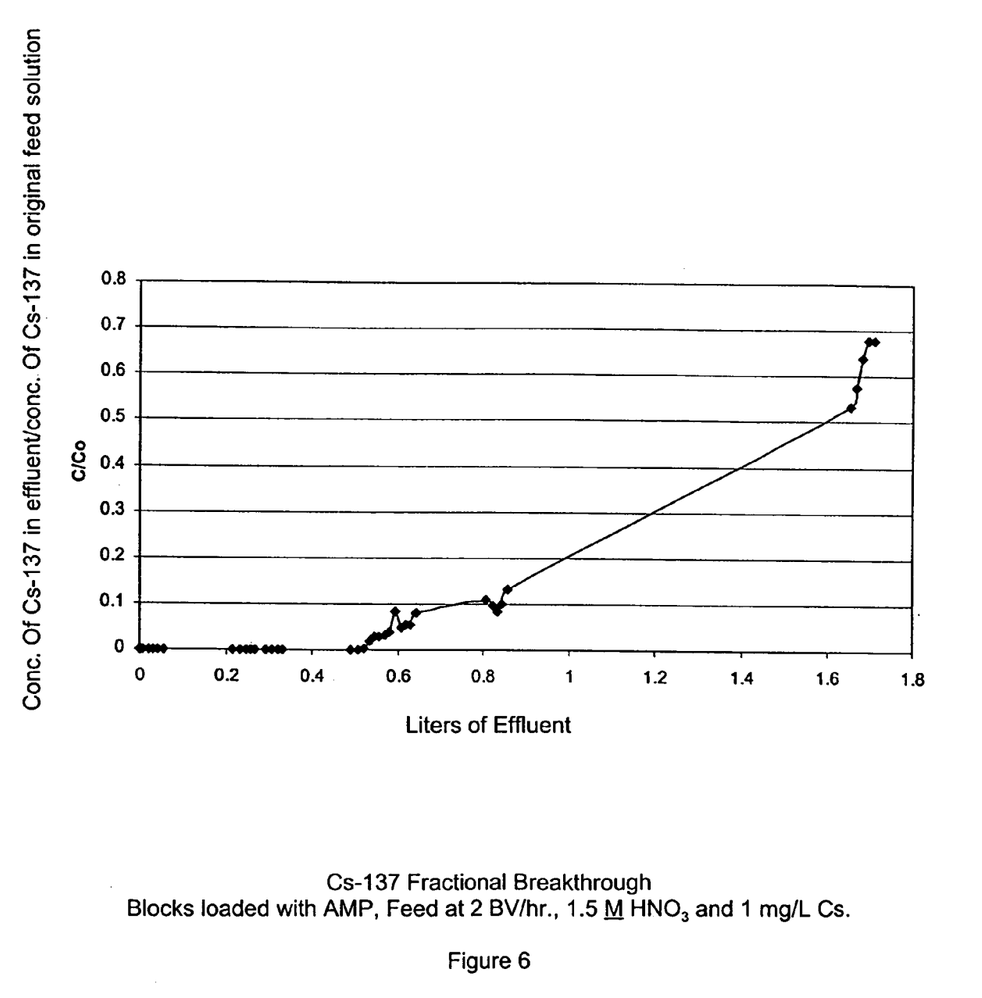
FIG. 6 $^{137}$Cs fractional breakthrough (concentration of $^{137}$Cs in effluent/initial feed concentration of $^{137}$Cs). Blocks loaded with AMP. Feed rate 2 BV/hr, 1.5 M HNO$_3$ and 1 mg/L Cs.

Blocks of the perforated microspheres were impregnated with AMP. The block parameters were slightly different from those in the example above, but the AMP loading method and conditions were the same. The tests were performed with either one block, or two blocks stacked in series. The blocks were placed in "shrink wrap" tubing and heated to form a tight fitting column and to prevent channeling around the exterior of the blocks. Feed solutions were $HNO_3$ containing stable $^{133}Cs$ and radioactive $^{137}Cs$. Feed was introduced at the top of the column and allowed to gravity flow through the block(s). Consistent flow rate was maintained at either 2 or 4 bed volumes per hour (BV/hr) with an FMI valveless metering pump (Model QVG-50). Samples were taken from the effluent of the column periodically and analyzed by gamma-ray spectroscopy to determine cesium breakthroughs. The results and parameters are shown in FIGS. 4–6.

Example 3

Two batch contact tests were performed using blocks of the perforated microspheres impregnated with octyl(phenyl)-N-N-diisobutyl-carbamoylmethylphosphine oxide (CMPO). The blocks were prepared by loading the CMPO, dissolved in hexane or acetone, into the hollow microspheres under vacuum, as described above, and then drying under moderate temperatures to evaporate the solvent. Parameters of the tests were as follows:

| Test #1: | |
|---|---|
| Block: | #105 |
| CMPO: | 0.4149 grams |
| Solvent: | acetone |
| Drying time: | 2 hr at 100° C. |
| Feed: | 2.5 M $HNO_3$ with 74 Bq/mL Am-241 |
| Temp.: | 23° C. |
| Test #2: | |
| Block: | #106 |
| CMPO: | 0.2854 grams |
| Solvent: | hexane |
| Drying time: | 2 hr at 100° C. |
| Feed: | 2.5 M $HNO_3$ with 70 Bq/mL Am-241 |
| Temp.: | 23° C. |

Figure 7:
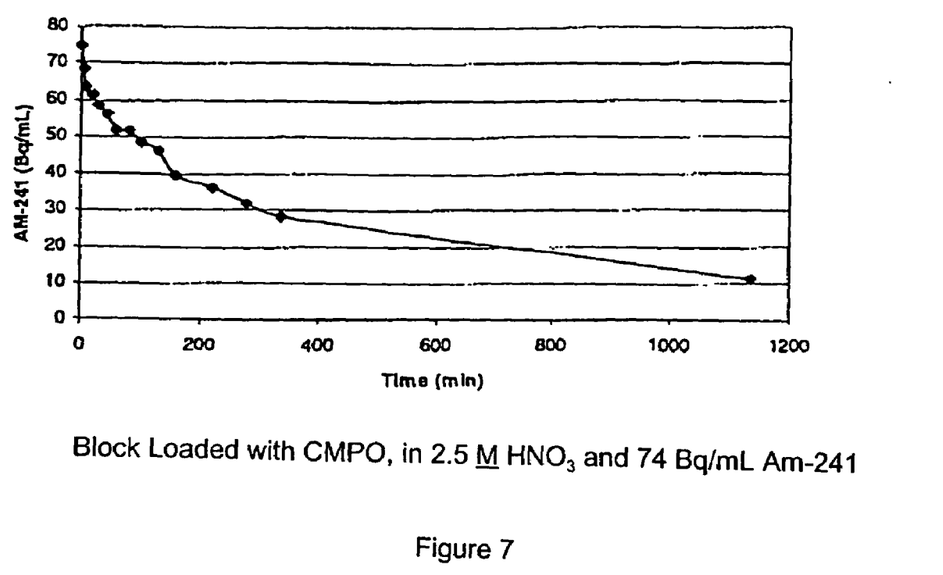
FIG. 7 Amount of $^{241}$Am removed from solution vs. time using the microsphere material of the invention loaded with CMPO, 74 Bq/mL $^{241}$Am.
Figure 8:
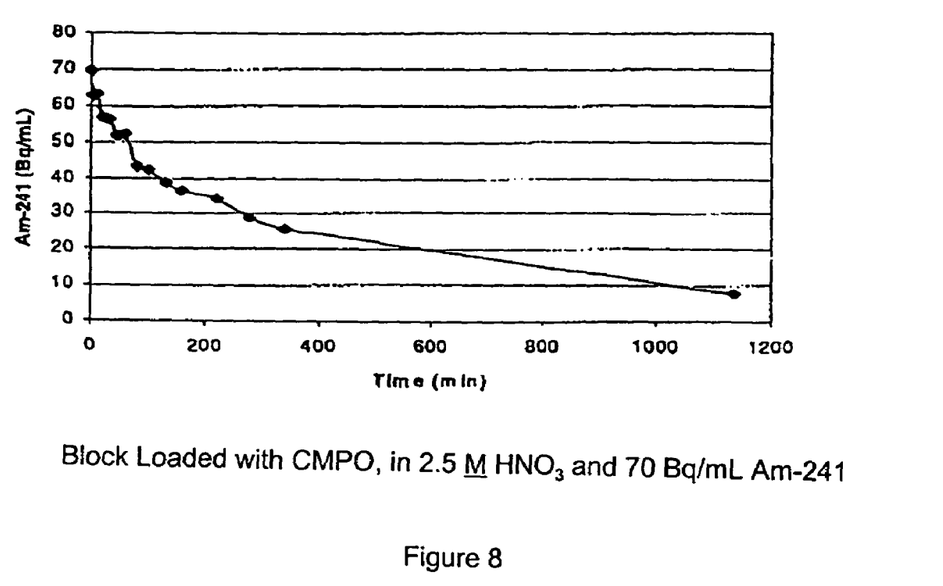
FIG. 8 Amount of $^{241}$Am removed vs. time using the microsphere material of the invention loaded with CMPO, 70 Bq/mL $^{241}$Am.

In each of the tests the block was suspended in 120 mL of feed solution with a stainless steel wire. The solution was stirred constantly and 0.5 mL samples were removed at given time intervals to be analyzed by gamma-ray spectrometry. The results are shown in FIGS. 7 and 8. These data indicate substantial removal of americium from acidic nuclear waste.

Example 4

A dynamic column test was performed as in Example 2 above, using two blocks stacked in series, with the following differences: The feed solution used was a simulated acidic radioactive tank waste solution like that found at the Idaho National Engineering and Environmental Laboratory shown below.

TABLE 1

Average composition of tank waste simulants.

| Component | (M) |
|---|---|
| Ag | 3.0E–05 |
| B | 1.95E–02 |
| Ca | 6.1E–02 |
| Cd | 3.32E–03 |
| Cr | 5.4E–03 |
| Cs | 9.78E–06 – 2.76E–05 |
| Fe | 2.5E–02 |
| Hg | 1.60E–03 |
| K | 2.0E–01 |
| Mn | 1.2E–02 |
| Mo | 7.3E–04 |
| Na | 1.9E+00 |
| Pb | 1.4E–03 |
| Sr | 2.0E–05 |
| Zr | 9.0E–03 |
| Al | 7.0E–01 |

TABLE 1-continued

Average composition of tank waste simulants.

| Component | (M) |
|---|---|
| $SO_4$ | 3.0E–02 |
| $PO_4$ | 2.04E–02 |
| F | 6.8E–02 |
| Cl | 3.05E–02 |
| $HNO_3$ | 1.8 |

Figure 9:
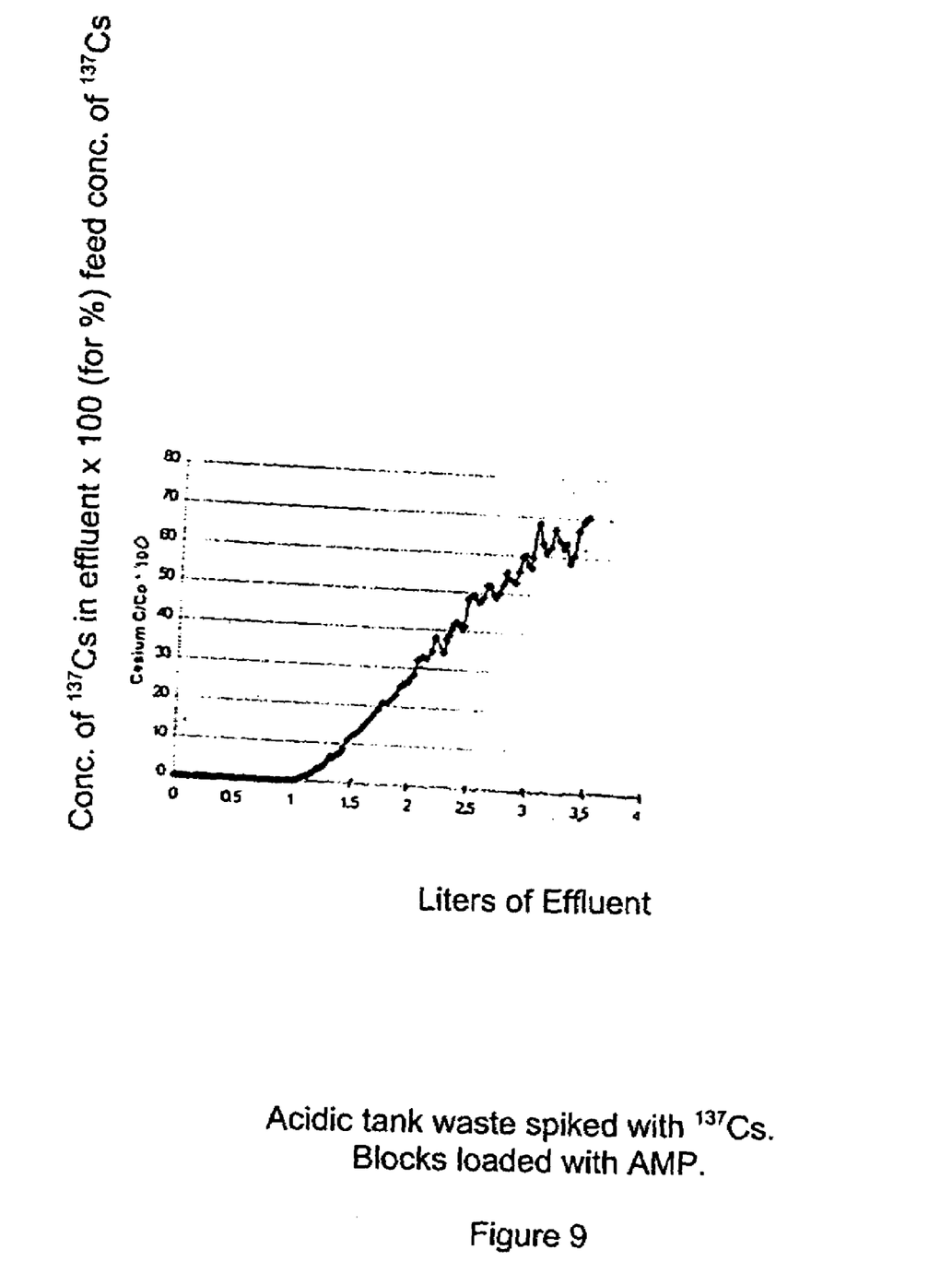
FIG. 9 Ratio of concentration of $^{137}$Cs in effluent to concentration of $^{137}$Cs in feed solution of acidic tank waste spiked with $^{137}$Cs vs. liters of feed solution processed through the column. Blocks loaded with AMP.
Figure 10:
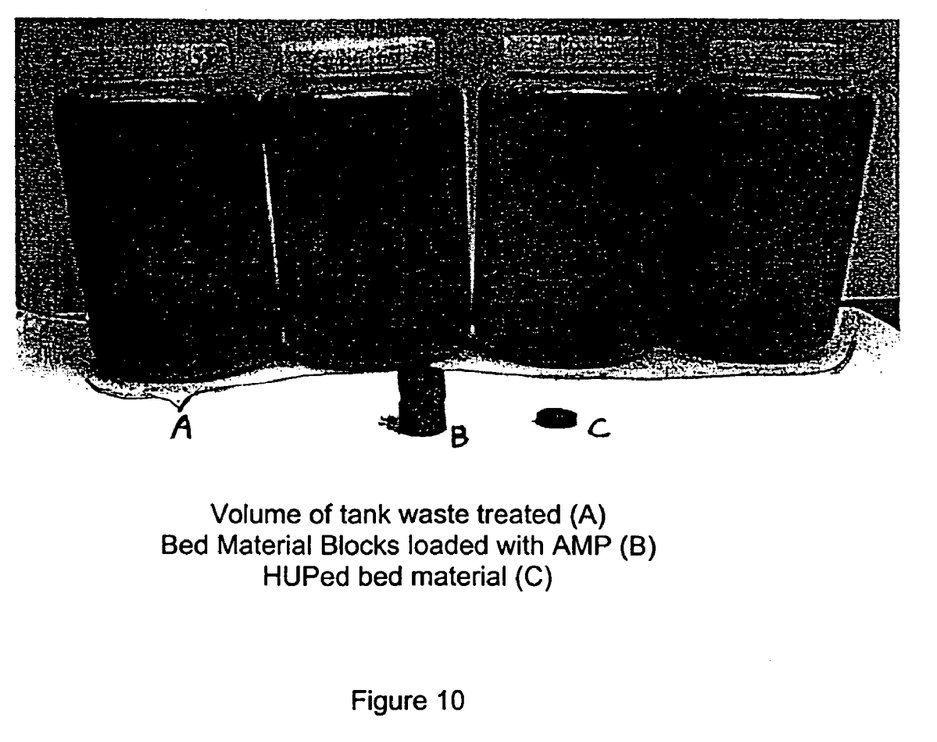
FIG. 10 Volume of tank waste treated (A), volume of the loaded microsphere material (B), and the final waste form volume (C).

The simulant was spiked with 600 Bq/mL of NIST traceable $^{137}Cs$, and the feed rate was 1 bed volume/hr. The total AMP mass loading was 2.21 g of AMP, which was approximately 35% by mass. After loading, the material was further consolidated by hot uniaxial pressing (HUPing) to about 30% of the original volume resulting in a waste volume reduction of approximately 1400. Results of this test are shown in FIGS. 9 and 10. FIG. 9 shows the ratio of the concentration of $^{137}Cs$ in effluent to the concentration of $^{137}Cs$ in the feed solution vs. liters of effluent. FIG. 10 is a representation of the dramatic reduction in the volume of liquid radioactive waste obtainable by the invention, starting with approximately 4.1 liters of tank waste. The $^{137}Cs$ is removed by two small blocks of about 9 cc volume of the invention material loaded with AMP, and further compressed by HUPing into one small block.

Example 5

Figure 11:
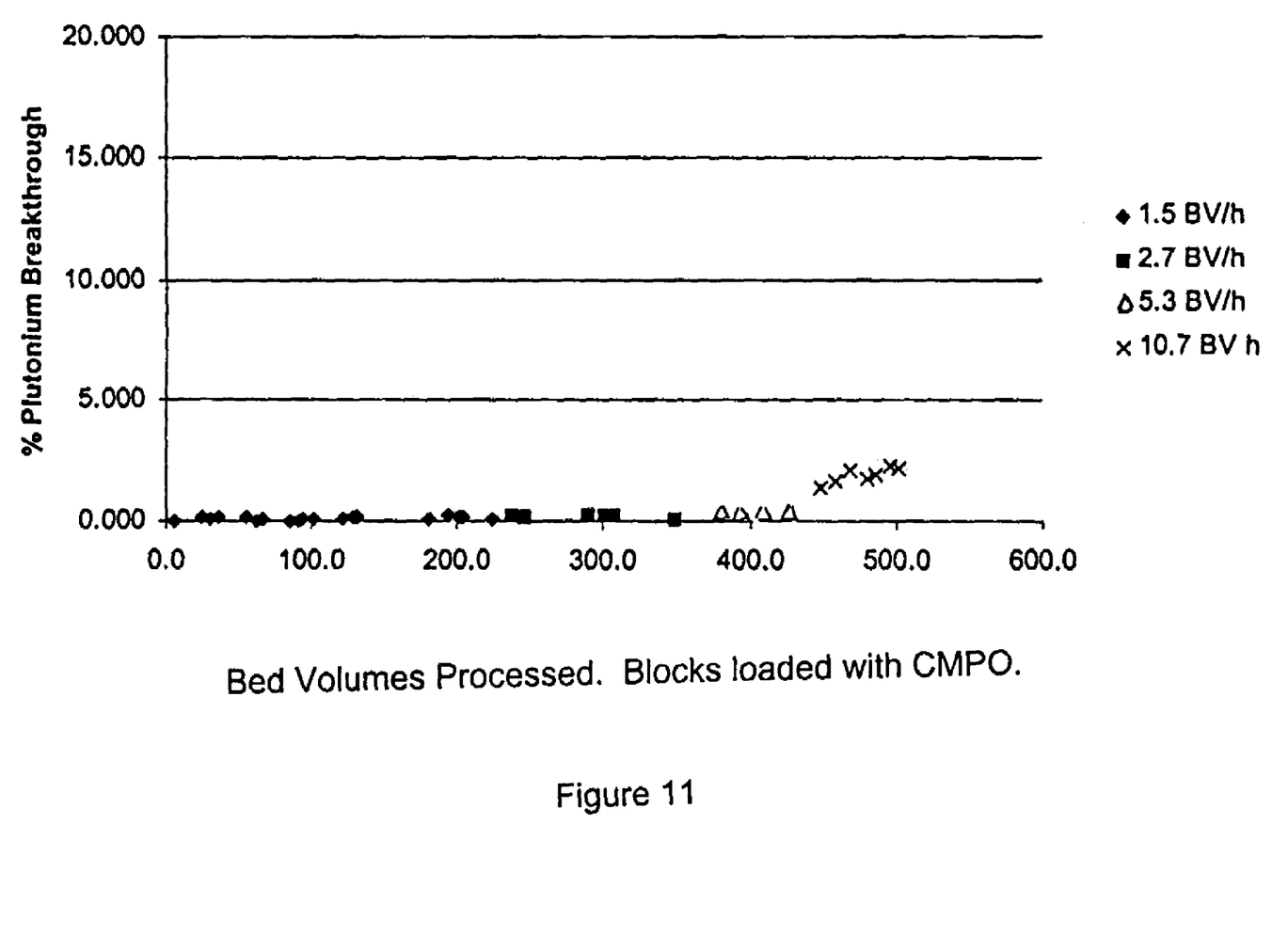
FIG. 11 % Plutonium breakthrough vs. bed volumes processed. Blocks loaded with CMPO.

A dynamic column test was performed to test the ability of the porous glass microspheres to remove plutonium in a continuous process. A column was prepared with approximately 6 cc of the porous microsphere material loaded with 2.86 grams of CMPO by the method described in Example 3. The feed for this test was 2.5 M $HNO_3$ spiked Pu-239 for an activity of approximately 100 Bq/mL. As shown is the FIG. 11, over 400 bed volumes were processed at flow-rates of 1.5, 2.7, and 5.3 BV/h with no Pu-239 seen in the column effluent. This is as expected since the actual mass of Pu-239 in the solution is small relative to the capacity of the CMPO. When the flow-rate was increased to 10.7 BV/h, the Pu-239 in the effluent rises to about 2.5% of the influent concentration and then remains steady at this value. This "slippage" from the column is not due to column loading but rather is indicative of the fact that the exchange zone has become too long for this combination of flow-rate and column length.

It is possible to remove other hazardous material such as mercury and arsenic by choosing appropriate ion exchangers or extractants and loading them into the microsphere material of the invention in the manner described above.

Having described the invention in its preferred forms, it is to be noted here that various changes and modifications are possible without substantially departing from the spirit and scope of the invention which is defined by the appended claims.

The invention claimed is:

1. A method of making an extractant material adapted to remove contaminants from fluid waste, comprising:
   a) Providing at least one porous molded glass matrix comprising perforated hollow glass crystalline microspheres obtained from fly ash, and
   b) impregnating said microspheres with an extractant compound by
      i) dissolving at least one reactant used to make said extractant compound in a solvent, ii) loading said solvent containing said at least one reactant into said porous matrix under vacuum,
iii) drying said matrix,
iv) dissolving at least one other reactant used to make said extractant in said solvent,
v) repeating steps (ii) and (iii) with said at least one other reactant, to cause said reactants to react and precipitate said extractant compound in-situ, and
vi) using ammonium molybdophosphate (AMP) as said extractant compound and ammonium hydroxide as said solvent.

2. A method of making an extractant material adapted to remove contaminants from fluid waste, comprising:
a) Providing at least one porous molded glass matrix comprising perforated hollow glass crystalline microspheres obtained from fly ash, and
b) impregnating said microspheres with an extractant compound by
i) dissolving at least one reactant used to make said extractant compound in a solvent,
ii) loading said solvent containing said at least one reactant into said porous matrix under vacuum,
iii) dissolving at least one other reactant used to make said extractant in said solvent,
v) flowing said solvent containing said at least one other reactant around said microspheres, to diffuse said at least one other reactant into said microspheres and precipitate said extractant compound in situ, and
vi) using ammonium molybdophosphate (AMP) as said extractant compound and ammonium hydroxide as said solvent.

3. The method of claim 2 wherein said extractant compound is AMP and said at least one reactant comprises $NH_4NO_3$ and $(NH_4)_6Mo_7O_{24}$ in a citric acid and water solution, and said at least one other reactant is $(NH_4)_2HPO_4$ in water.

4. The method of claim 2 wherein said extractant compound is octyl(phenyl)-N-N-diisobutyl-carbamoylmethylphosphine oxide (CMPO), and said solvent is selected from the group consisting of acetone and hexane.

5. The method of claim 2 wherein said extractant compound is selected from the group consisting of resorcin formaldehyde resin (RFR) and a tertiary phosphine oxide POR where R=alkyl groups having 5–9 carbon atoms.

6. The method of claim 5 where said tertiary phosphine oxide is iosamyl-heptyl-nonyl-phosphine oxide.

7. An inorganic ion exchange material, adapted to remove radioactive ions from acidic waste liquid, made by:
i) providing at least one porous molded glass matrix comprising perforated hollow glass crystalline microspheres obtained from fly ash, and
ii) impregnating said microspheres with AMP and using ammoium hydroxide as a solvent.

8. The inorganic ion exchange material of claim 7 wherein said radioactive ions are cesium ions.

9. The inorganic ion exchange material of claim 7 wherein said radioactive ions are selected from actinides and lanthanides.

10. An inorganic ion exchange material comprising a porous molded glass matrix comprising perforated hollow glass crystalline microspheres obtained from fly ash, wherein said microspheres are impregnated with AMP.

11. The inorganic ion exchange material of claim 10 further containing ions selected from cesium ions, lanthanide ions and actinide ions.

* * * * *